May 14, 1968 J. MANTELET 3,382,573
METHOD OF ASSEMBLY BY ELECTRIC WELDING OF STACKS
OF LAMINATIONS FOR THE STATORS OF
ROTARY ELECTRIC MACHINES
Filed April 29, 1964 2 Sheets-Sheet 1

INVENTOR
JEAN MANTELET
BY Young & Thompson
ATTORNEYS

May 14, 1968  J. MANTELET  3,382,573
METHOD OF ASSEMBLY BY ELECTRIC WELDING OF STACKS
OF LAMINATIONS FOR THE STATORS OF
ROTARY ELECTRIC MACHINES
Filed April 29, 1964  2 Sheets-Sheet 2
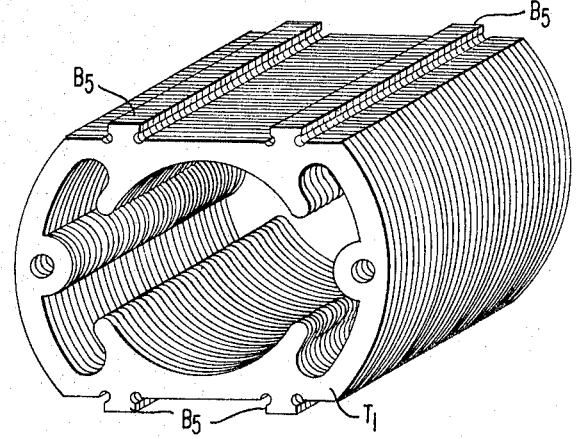
FIG. 10
FIG. 11
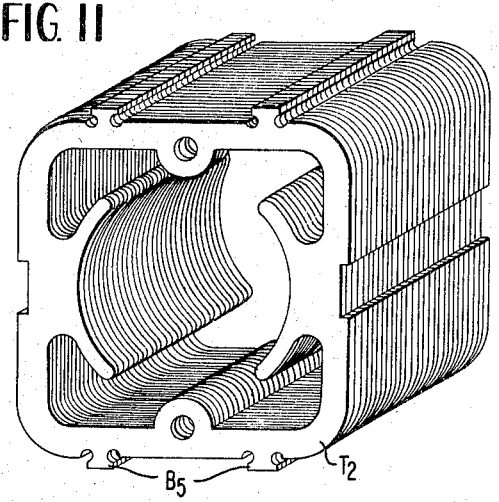
FIG. 16
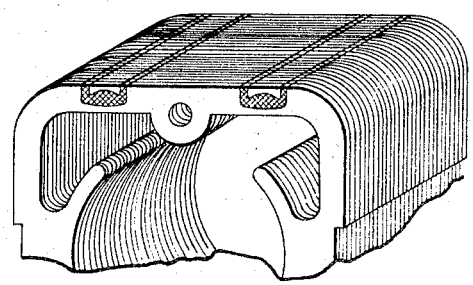
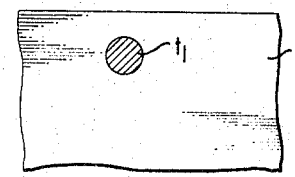
FIG. 12
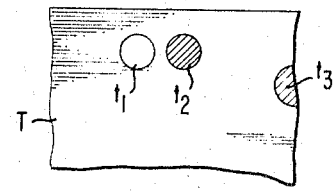
FIG. 13
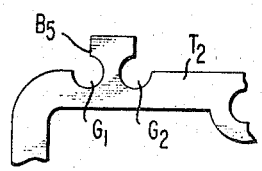
FIG. 14
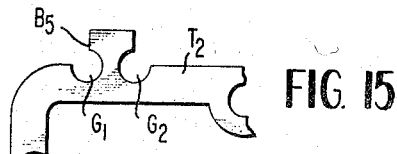
FIG. 15
INVENTOR
JEAN MANTELET
BY Young + Thompson
ATTORNEYS

United States Patent Office 3,382,573
Patented May 14, 1968

3,382,573
METHOD OF ASSEMBLY BY ELECTRIC WELDING OF STACKS OF LAMINATIONS FOR THE STATORS OF ROTARY ELECTRIC MACHINES
Jean Mantelet, Paris, France, assignor to Moulinex-Societe Anonyme, a corporation of France
Filed Apr. 29, 1964, Ser. No. 363,385
Claims priority, application France, May 7, 1963, 933,853
6 Claims. (Cl. 29—609)

It is well known that the efficiency of a rotary electrical machine increases in proportion as the air-gap becomes smaller, which implies a perfect uniformity of the said air-gap. For this reason, the manufacturers of high duty electrical machines have been led to discontiue the method of assembly of the stack of stator laminations by riveting because of the unavoidable spreading out of the laminations which becomes more pronounced as the distance from the axis of the rivet increases, and due to the lack of parallelism of the end sheets, due especially to the inequalities of the burrs caused by the punching-out operation.

It has been proposed to replace the riveting method by a method of assembly by welding with the addition of metal, necessitating the provision, on the large straight sides of the sheets, of slots which are maintained coaxial by clamping the lamination sheets of the stack in the jaws of a vice and consisting of the interposition between the electrodes which are brought-up to the flat faces of the stack of sheets perpendicular to these latter and the slots with which they are provided, of soft iron wires permitting the formation of as many lines of welding as there are rows of slots.

This method has proved satisfactory in the quality of the result obtained, but has the disadvantage of a relatively long time of operation, which substantially affects the production cost.

Two other methods, still less rapid, involving the use of arc welding or welding by torch without added metal, have been proposed but have not been continued for this reason on the industrial scale.

It has also been proposed to effect the assembly by electric welding at the tops of trapezoidal bosses formed on the straight sides of the sheets, but the contact section of the electrodes being less than the base section of the bosses, there is produced a forging action by rapid heating of the tops of the bosses, the molten metal running out of each side of the boss under the electrode. The weld obtained is therefore not satisfactory.

The method of assembly by electric welding of lateral bosses on the stator laminations, according to the invention, overcomes this drawback. It consists in providing the sheets with bosses in which the section of passage for the current, parallel to the contact section, is less than the said contact section in the vicinity of the junction of the bosses with the straight sides of the sheets.

By virtue of this arrangement, the melting of the metal takes place in the zone having the smallest section, and the molten metal is received in the two free zones existing respectively on each side of the said section, between the straight edges of the lamination sheets and the convergent edges of the bosses, while under the pressure of the electrodes, the contact section approaches the corresponding straight sides of the sheets.

In accordance with a further characteristic feature of the invention, two symmetrical gutters are formed on each side of the zone of least section so as to affect the straight edges of the sheets and to obtain a substantial sagging of the contact section.

The invention has also for its object a preferred form of embodiment, in accordance with which the gutters formed on each side of the zone of least section, preferably in the form of fraction of circumference, have dimensions such that, at the end of the welding operation, they contain the whole of the molten metal, and that the contact section becomes level with the straight sides o the laminations.

In accordance with a further characteristic feature of the invention, the lamination sheets are cut out in a press by means of a single tool with a number of stations, punching out during the first pass for example, the circular holes forming the external contour of the zone of least section of all the bosses, then, at a second pass, the circular holes forming the internal contour of the same portion of the said bosses and preferably the passage holes for the tie-rods, and finally, during the course of a third and last pass, the cutting-out of the sheets and their bosses.

The invention will be more clearly understood by means of the description which follows below, reference being made to the accompanying drawings, in which:

FIG. 10 shows a persepective view of a block of laminations for a universal motor;

FIG. 11 shows a similar view of a block of square laminations which are suitable either for a universal motor or for an asynchronous motor;

FIGS. 12 to 14 show diagrammatically the three punching passes necessary for the manufacture of the sheets;

FIG. 15 is a partial view in plan of the cut-out sheet; and

FIG. 16 is a partial view in perspective of a block of laminations after welding.

FIGS. 1 to 5 represent five forms of producing the bosses B1 to B5, according to the invention, in which the passage section $s$ in the vicinity of the straight sides of the sheet is less than the section of contact S of the electrode, these examples being furthermore non-limitative.

Figure 6:
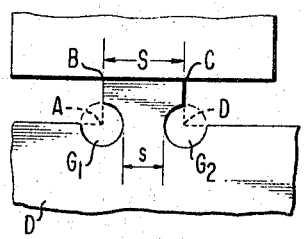
FIGS. 6 to 9 show a diagrammatic form of the different stages of welding perpendicular to a boss.
Figure 7:
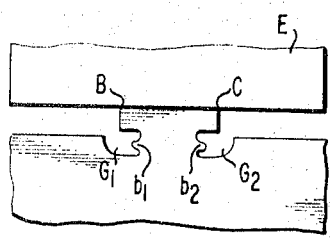

The preferred form of construction which is shown on a larger scale in FIG. 6, is derived from the rectangular boss ABCD adjacent to the straight side of the lamination sheet by cutting out two fractions of circumference having as their respective centers the points A and D and forming two circular gutters G1, G2. The section of passage $s$ is very much less than the contact section S of the electrode E. The section $s$ heats-up much more rapidly than the remaining portion of the boss, so that it is directly above this section that the metal melts, forming two lateral excrescences $b1$, $b2$ (FIG. 7), while under the pressure of the electrode E, the contact section S approaches the straight line face of the sheets.

Figure 8:
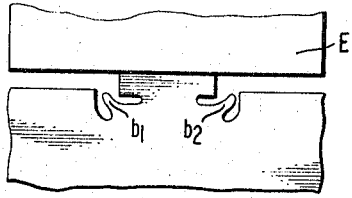
Figure 9:
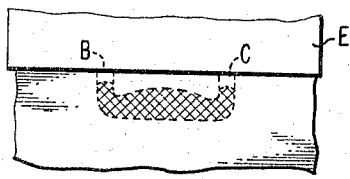

These excrescences of fillets spread out progressively, as shown in FIG. 8, and take-up a gradually increasing portion of the gutters, until the contact section BC comes into alignment with the straight edges of the sheets (see FIG. 9). The weld is completed in the form of a thick strip having the shape shown in cross-hatching in this same figure.

Figure 1:
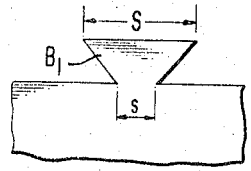
FIGS. 1 to 5 are partial views showing five forms of construction of bosses according to the invention.
Figure 2:
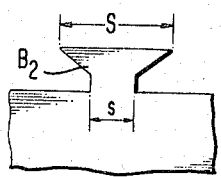
Figure 3:
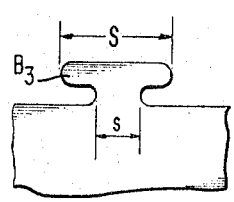
Figure 4:
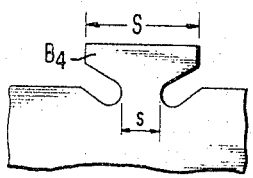
Figure 5:
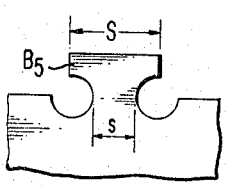

FIGS. 10 and 11 show respectively a stack of sheets T1 for universal motors and a stack of sheets T2 which can be employed either for a universal motor or for an asynchronous motor. Each of these stacks comprises four rows of bosses B5, identical with that of FIG. 5, this arrangement not being any more essential than the number of bosses.

FIGS. 12 to 14 illustrate diagrammatically the manufacture by a press with the aid of a single tool with a number of stations, of a lamination sheet T2 in accordance with FIG. 11, this having been only partially shown for the purpose of simplification.

A set of circular punches punch out the holes t1, corresponding to one of the gutters G1 or G2, as shown in FIG. 12, and then in FIG. 13 a second set of punches forms the complementary holes t2 and, if so required, simultaneously punches the passage holes t3 for the tie-rods and finally (FIG. 14) the sheet is cut-out along its external and internal contours, as shown in FIG. 15.

What I claim is:

1. A method of producing a stacked part of a rotary electric machine, comprising assembling a stack of laminations of magnetic metal of which each lamination has an outstanding peripheral tooth having a rectilinear top and a root narrower than said top with said laminations in contact with each other and said teeth aligned to provide at least one continuous rib spanning the stack and having an enlarged flat top and a narrower base, completing an electric circuit through said stack by means including an electrode that rests flat on said enlarged flat top to soften said narrower base by electric resistance heating, and pressing said electrode against said rib to mash said narrower base and press said enlarged flat top closer to the rest of said stack and to weld together the adjacent laminations.

2. A method as claimed in claim 1, wherein the root of each tooth formed on the edge of a lamination extends between two notches cut out in said edge, so that the narrower base of said rib provided on the stack of laminations by the aligned teeth lies between two gutters formed in the lateral surface of said stack, which gutters provide two spaces into which the narrower base mashes when the electrode and said enlarged flat top are pressed together.

3. A method as claimed in claim 2, wherein the area of the part of each tooth projecting beyond the contour of the two sides of the stack outside the notches is substantially equal to the sum of the areas of the two notches inside said contour, so that the gutters formed in the lateral surface of the stack by the aligned notches receive substantially the whole of the molten metal produced during welding and at the end of the pressing operation, and pressing said enlarged flat top of the rib into substantial alignment with said contour.

4. A method of producing a stacked part of a rotary electric machine, comprising cutting out a plurality of laminations of magnetic metal of which each lamination has an outstanding peripheral tooth having a rectilinear top and a root narrower than said top, assembling a stack of said laminations in contact with each other with said teeth aligned to provide at least one continuous rib spanning the stack and having an enlarged flat top and a narrower base, completing an electric circuit through said stack by means including an electrode that rests flat on said enlarged flat top to soften said narrower base by electric resistance heating, and pressing said electrode against said rib to mash said narrower base and press said enlarged flat top closer to the rest of said stack and to weld together the adjacent laminations.

5. A method as claimed in claim 4, wherein the root of each tooth formed on the edge of a lamination extends between two notches cut out in said edge, so that the narrower base of said rib provided on the stack of laminations by the aligned teeth lies between two gutters formed in the lateral surface of said stack, which gutters provide two spaces into which the narrower base mashes when the electrode and said enlarged flat top are pressed together.

6. A method as claimed in claim 5, wherein the area of the part of each tooth projecting beyond the contour of the two sides of the stack outside the notches is substantially equal to the sum of the areas of the two notches inside said contour, so that the gutters formed in the lateral surface of the stack by the aligned notches receive substantially the whole of the molten metal produced during welding and at the end of the pressing operation, and pressing said enlarged flat top of the rib into substantial alignment with said contour.

References Cited

UNITED STATES PATENTS

| | | |
|---|---|---|
| 2,448,785 | 9/1948 | Dolan. |
| 2,680,285 | 6/1954 | Furnas. |
| 2,774,897 | 12/1956 | Matthews _____ 310—217 |
| 2,845,555 | 7/1958 | Carpenter et al. _____ 310—216 |

FOREIGN PATENTS 703,529   2/1954   Great Britain.

JOHN F. CAMPBELL, *Primary Examiner.*

R. W. CHURCH, *Assistant Examiner.*